United States Patent Office 3,058,998
Patented Oct. 16, 1962

3,058,998
PROCESS OF PREPARING OLEFINS OF SULFONATE ESTERS OF SECONDARY ALCOHOLS
Harold Russ Nace, Providence, R.I., assignor to E. I. du Pont de Nemours and Company, Wilmington, Del., a corporation of Delaware
No Drawing. Filed Aug. 16, 1957, Ser. No. 678,536
8 Claims. (Cl. 260—397.2)

This invention is directed to an improved process for converting secondary alcohols, via their sulfonate esters, into olefins. Higher yields of products which are less contaminated with difficult-to-separate by-products are generally obtained than with known prior art procedures.

A convenient route to certain olefins is the decomposition of an ester of the related secondary alcohol. A sulfonate ester is frequently employed. The decomposition is carried out at elevated temperatures, generally in the presence of a base so as to facilitate the elimination reaction and to neutralize the sulfonic acid formed. If an alcohol is used as the solvent, a considerable portion of the ester is converted to an ether; this not only reduces the yield of the desired olefin, but, also, the resulting ether-olefin mixture is difficult to separate. In addition to these complications, the decomposition reactions generally require considerable time in order to carry them to a practical stage of completion. Another problem is to find a medium which is suitable for carrying out the reaction and which is also a satisfactory solvent for the reactants.

It is an object of the present invention to provide an improved process for preparing olefins from the sulfonate esters of secondary alcohols wherein the reaction time is shortened and the yield of product is increased. It is a further object to eliminate formation of troublesome by-products, and, the solubility of the reactants is improved according to the present invention.

These and other objects will become apparent in the following description and claims.

It is known that carboxylic acid esters of secondary alcohols can be decomposed to olefins; commonly used are the acetate esters; however, these esters are frequently harder to prepare than the sulfonate esters and they require higher decomposition temperatures.

The olefins obtained according to the present invention are useful in the preparation of (1) epoxy derivatives which derivatives are used as stabilizers, plasticizers, and in plastics; (2) diols which may be used for making polyesters and polyurethanes; (3) as monomers for numerous polymers and copolymers; and, (4) for conversion to the following which have a wide range of intermediate utility: chlorohydrins, dibromides, dichlorides, mercaptans, and the like.

More specifically, the present invention is directed to the process of preparing olefins from sulfonate esters of secondary alcohols having the structure

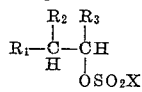

wherein $R_1$ is taken from the group consisting of hydrogen, alkyl, and an aromatic carbocyclic group; $R_2$ is taken from the group consisting of hydrogen, an aliphatic acyclic group, an aliphatic carbocyclic group and an aromatic carbocyclic group; $R_3$ is taken from the group consisting of an aliphatic acyclic group, an aliphatic carbocyclic group and an aromatic carbocyclic group; $R_2$ and $R_3$, together with the two carbon atoms indicated, may form an aliphatic carbocyclic ring; $R_1$, $R_2$ and $R_3$, together with the two carbon atoms indicated, may form a system taken from the group consisting of a fused alicyclic system and a fused aromatic-alicyclic system; and, X is taken from the group consisting of an aliphatic and an aromatic group, said sulfonate ester being dissolved in a solvent taken from the group consisting of (1) 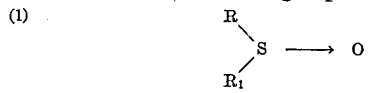

where R and $R_1$ are alkyl and the total number of carbon atoms in R and $R_1$ is within the range of 2–8;

(2) 

where R is taken from the group consisting of hydrogen, methyl and ethyl;

(3) 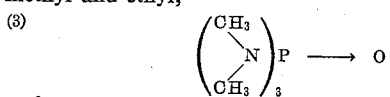

and (4) 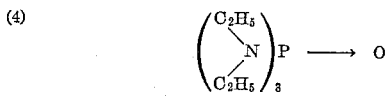

followed by heating to decompose said ester and recovering the olefin product.

The sulfoxide solvent

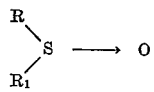

where R and $R_1$ total 2 to 8 carbons, may be symmetrical or asymmetrical.

The process of this invention is carried out by dissolving the sulfonate ester in dimethyl sulfoxide, or other designated solvent, and, the solution is then heated for several hours to bring about the decomposition of the ester. A basic material, such as sodium bicarbonate may be used to neutralize the acid formed. The reaction is then worked up by drowning in ice water and separating the water-insoluble fraction. Alternately, solvent extraction may be employed. The crude product can be purified by usual procedures, such as distillation or recrystallization.

The relative quantities of ester and solvent are not critical and will generally be determined by convenience; enough solvent being employed to afford a solution of the ester. The temperature of the reaction can be varied from room temperature to about 110° C., the preferred temperature range is 90 to 100° C. Lower temperatures require longer reaction times and higher temperatures bring about decomposition of the solvent as well as polymerization or rearrangement of the olefin produced.

The sulfonate esters are generally prepared by reacting a sulfonyl chloride with the appropriate secondary alcohol in the presence of caustic. Suitable sulfonyl chlorides are methane sulfonyl chloride, ethane sulfonyl chloride, 1-octane sulfonyl chloride, benzene sulfonyl chloride, p-toluene sulfonyl chloride, p-bromobenzene sulfonyl chloride, and 2-naphthalene sulfonyl chloride.

The following alcohols are representative of those that can be used in the present process of preparing olefins: 1-menthol, beta-cholestanol, cyclohexanol, cyclo-pentanol, alkyl derivatives of cyclohexanol and cyclopentanol, 1,2,3,4-tetrahydro-1-naphthol, 1,2,3,4-tetrahydro-2-naphthol, decahydro-1-naphthol, decahydro-2-naphthol, phenyl methyl carbinol, octanol-2, and 2-ethylhexanol.

It is advantageous that the solvent be a liquid at room temperature, relatively high-boiling, and, water-soluble. It must be a polar material, since it is believed that high solvating power is necessary in order to obtain the improvements which are the objects of the invention. Representative suitable materials are dimethyl sulfoxide, diethyl sulfoxide, ethyl methyl sulfoxide, formamide, dimethyl formamide, diethyl formamide, hexamethyl phosphoramide, and hexaethyl phosphoramide.

The following representative examples further illustrate the present invention.

EXAMPLE 1

1-Menthyl p-Toluene Sulfonate With Dimethyl Sulfoxide

A solution of 31.0 g. (0.10 mole) of 1-menthyl p-toluene sulfonate in 100 ml. of dimethyl sulfoxide was heated at 100° C. under reflux for 10 hours. On allowing to cool to room temperature the solution separated into two layers. The mixture was extracted with two 25-ml. portions of petroleum ether (B.P. 30–60° C.) and the insoluble portion was poured into 200 ml. of an ice and water mixture. This mixture was then extracted with two 25-ml. portions of petroleum ether. The petroleum ether extracts were combined and washed with water, dilute sodium bicarbonate solution, water, and saturated brine, and then dried over anhydrous sodium sulfate. The petroleum ether was removed by distillation through a 7″ Vigreux column, and the residue was distilled through a Gould column (Gould, Holzman and Niemann, Anal. Chem., 20, 361 (1948)). A total of 10.78 g. (78% yield) of a menthene mixture, consisting of 35% $\Delta^2$-menthene and 65% $\Delta^3$-menthene, was obtained, B.P. 55–66.5° C. (21 mm.); $n_D^{25}$ 1.4500–1.4510; $[\alpha]_D +75°$ (1% in $CHCl_3$):

TABLE I

*Reaction of Various Sulfonate Esters With Dimethyl Sulfoxide*

| Compound | Temp. (° C.) | Time, hrs. | Product | Yield, percent |
|---|---|---|---|---|
| 1-menthyl benzene sulfonate. | 89–91 | 6 | $\Delta^2$-, $\Delta^3$-menthene mixture. | 80 |
| Do | 86–88 | 5 | ---do--- | 75 |
| Do | 60 | 70 | ---do--- | 59 |
| 1-menthyl benzene sulfonate + sodium bicarbonate. | 100 | 5 | ---do--- | 80 |
| 1-menthyl p-bromobenzenesulfonate. | 100 | 5 | ---do--- | 83 |
| cyclohexyl benzene sulfonate. | 90–95 | 2 | cyclohexene | 65 |
| cyclohexyl p-toluene sulfonate. | 90–95 | 5 | ---do--- | 61 |
| 2-octyl benzene sulfonate | 100–107 | 0.75 | 2-octene | 52 |
| Do | 100 | 1 | ---do--- | 58 |
| 2-octyl 2-naphthalene sulfonate. | 100 | 1 | ---do--- | 30 |
| 3-beta-cholestanyl benzenesulfonate. | 100 | 2.5 | $\Delta^2$-, $\Delta^3$-cholestene mixture. | 82 |
| 3-beta-cholestanyl methanesulfonate. | 95–100 | 5 | ---do--- | 45 |
| 3-beta-cholestanyl p-toluenesulfonate. | 98–100 | 5 | ---do--- | 59 |

EXAMPLE 2

1-Menthyl Benzenesulfonate With Dimethylformamide

A solution of 15 g. (0.051 mole) of 1-menthyl benzenesulfonate in 50 ml. of dimethylformamide was heated under reflux at 100° C. for 24 hours. The reaction mixture was allowed to cool and was then extracted with two 20-ml. portions of petroleum ether (B.P. 30–60° C.). The insoluble material was poured into 100 ml. of an ice and water mixture and this mixture was then extracted with two 20-ml. portions of petroleum ether. The petroleum ether extracts were combined and washed successively with water, dilute sodium bicarbonate solution, water, and saturated brine, and finally dried over anhydrous sodium sulfate. The petroleum ether was removed by distillation through a 7″ Vigreux column and the residue was distilled through a Gould column. A total of 5.15 g. (75% yield) of a menthene mixture was obtained, B.P. 62–63° C. (19–20 mm.); $n_D^{25}$ 1.4491–1.4518.

EXAMPLE 3

1-Menthyl Benzenesulfonate With Formamide

A solution of 14.5 g. (0.05 mole) of 1-menthyl benzenesulfonate in 50 ml. of formamide was heated under reflux at 100° C. for 23 hours. After the reaction mixture had cooled to room temperature it was poured into an equal volume of an ice and water mixture and the resulting mixture was extracted with two 20-ml. portions of petroleum ether (B.P. 30–60° C.). The extract was washed with water, dilute sodium bicarbonate solution, water, and saturated brine, and dried over anhydrous sodium sulfate. The petroleum ether was removed by distillation through a 7″ Vigreux column. The residue was distilled through a Gould column to give 3.33 g. (48%) of menthenes, B.P. 57–58° C. (15 mm.); $n_D^{20}$ 1.4502–1.4512; $[\alpha]_D +74°$ (1% in $CHCl_3$).

EXAMPLE 4

1-Menthyl p-Toluenesulfonate With Hexamethyl

Preceding Example 3 was repeated using 25 ml. of diethyl formamide in place of the formamide. A 60% yield (4.13 g.) of menthenes was obtained, B.P. 60–63° C. (20 mm.); $n_D^{20}$ 1.4518–1.4522; $[\alpha]_D +49°$ (1% in $CHCl_3$).

EXAMPLE 5

1-Menthyl p-Toluenesulfonate With Hexamethyl Phosphoramide

A solution of 31.0 g. (0.10 mole) of 1-menthyl p-toluenesulfonate in 100 ml. of hexamethyl phosphoramide was heated at 100° C. under reflux for 10 hours. The reaction mixture was allowed to cool and was then poured into an equal volume of an ice and water mixture. The resulting mixture was extracted successively with 50 ml., 35 ml., and 30 ml. of petroleum ether (B.P. 30–60° C.). The extracts were combined, washed successively with water, dilute sodium bicarbonate solution, water, dilute hydrochloric acid, water, and saturated brine, and finally dried over anhydrous sodium sulfate. The petroleum ether was removed by distillation through a 7″ Vigreux column and the residue was distilled through a Gould column. A total of 10.8 g. (78% yield) of a menthene mixture consisting of 30% $\Delta^2$-menthene and 70% $\Delta^3$-menthene was obtained, B.P. 64–65° C. (23 mm.); $n_D^{25}$ 1.4492–1.4496; $[\alpha]_D +121°$ (1% in $CHCl_3$).

Essentially comparable results are obtained if hexaethyl phosphoramide is used in place of hexamethyl phosphoramide.

TABLE II

*Reaction of Various Sulfonate Esters With Hexamethyl Phosphoramide*

| Compound | Temp. (° C.) | Time, hrs. | Product | Yield, percent |
|---|---|---|---|---|
| 1-menthyl-benzenesulfonate | 100 | 17 | $\Delta^2$-, $\Delta^3$-menthene mixture. | 77 |
| cyclohexyl p-toluene sulfonate. | 100 | 6 | cyclohexene | 62 |
| 2-octyl-benzene-sulfonate | 100 | 3 | 2-octene | 62 |
| 3-beta-cholestanyl benzenesulfonate. | 100 | 21 | $\Delta^2$-, $\Delta^3$-cholestene mixture. | 53 |

TABLE III

*Reaction of Various Sulfonate Esters With Dimethylformamide*

| Compound | Temp. (° C.) | Time, hrs. | Product | Yield, percent |
|---|---|---|---|---|
| 1-menthyl benzenesulfonate | 95–100 | 24 | $\Delta^2$-, $\Delta^3$-menthene mixture. | 67 |
| cyclohexyl p-toluene sulfonate. | 100 | 5.5 | cyclohexene | 55 |
| 3-beta-cholestanyl benzenesulfonate. | 100 | 7 | $\Delta^2$-, $\Delta^3$-cholestene mixture. | 22 |

The process of the present invention may be conveniently carried out at atmospheric pressure.

The embodiments of the invention in which an exclusive property or privilege is claimed are defined as follows:

1. In the process of preparing olefins wherein an organic sulfonate ester of an olefin-forming secondary alcohol is heated to effect elimination of a hydrogen atom and organic sulfonate group from adjacent carbon atoms with resulting formation of an olefinic double bond, the improvement wherein said ester is heated at a temperature within the range of about 20° C. to about 110° C., in solution in a polar solvent selected from the group consisting of di-lower alkyl sulfoxides and hexa-lower alkyl phosphoramides.

2. The process of claim 1 wherein the secondary alcohol is beta-cholestanol.

3. The process of claim 1 wherein the secondary alcohol is l-menthol.

4. In the process of preparing olefins wherein an organic sulfonate ester of an olefin-forming secondary alcohol is heated to effect elimination of a hydrogen atom and organic sulfonate group from adjacent carbon atoms with resulting formation of an olefinic double bond, the improvement wherein said ester is heated at a temperature within the range of about 20° C. to about 110° C., in solution in dimethyl sulfoxide as polar solvent.

5. In the process of preparing olefins wherein an organic sulfonate ester of an olefin-forming secondary alcohol is heated to effect elimination of a hydrogen atom and organic sulfonate group from adjacent carbon atoms with resulting formation of an olefinic double bond, the improvement wherein said ester is heated at a temperature within the range of about 20° C. to about 110° C., in solution in hexaethyl phosphoramide as polar solvent.

6. In the process of preparing olefins wherein an organic sulfonate ester of an olefin-forming secondary alcohol is heated to effect elimination of a hydrogen atom and organic sulfonate group from adjacent carbon atoms with resulting formation of an olefinic double bond, the improvement wherein said ester is heated at a temperature within the range of about 20° C. to about 110° C., in solution in hexamethyl phosphoramide as polar solvent.

7. In the process of preparing olefins wherein an organic sulfonate ester of $\beta$-cholestanol is heated to effect elimination of a hydrogen atom and organic sulfonate group from adjacent carbon atoms with resulting formation of an olefinic double bond, the improvement wherein in said ester is heated at a temperature within the range of about 20° C. to about 110° C., in solution in dimethyl sulfoxide as polar solvent.

8. In the process of preparing olefins wherein an organic sulfonate ester of l-menthol is heated to effect elimination of a hydrogen atom and organic sulfonate group from adjacent carbon atoms with resulting formation of an olefinic double bond, the improvement wherein said ester is heated at a temperature within the range of about 20° C. to about 110° C., in solution in dimethyl sulfoxide as polar solvent.

References Cited in the file of this patent

UNITED STATES PATENTS

| | | |
|---|---|---|
| 2,286,407 | Halbig | June 16, 1942 |
| 2,365,898 | Morris et al. | Dec. 26, 1944 |
| 2,520,656 | Reichstein | Aug. 29, 1950 |
| 2,725,388 | Bernstein et al. | Nov. 29, 1955 |
| 2,756,252 | McKinnis | July 24, 1956 |
| 2,781,364 | Ziegler et al. | Feb. 12, 1957 |
| 2,882,282 | Agnello et al. | Apr. 14, 1959 |

OTHER REFERENCES

Huckel et al.: Liebig's Annalen der Chemie, vol. 543, 1940, page 217 only.

Huckel: Berichte, vol. 74, 1941, page 657.

Rodd: Chemistry of Hydrocarbon Compounds, vol. 11b, 1953 (page 536 only), Elsevier Press, 155 E. 82nd St., New York 28, N.Y.